Figure 1:
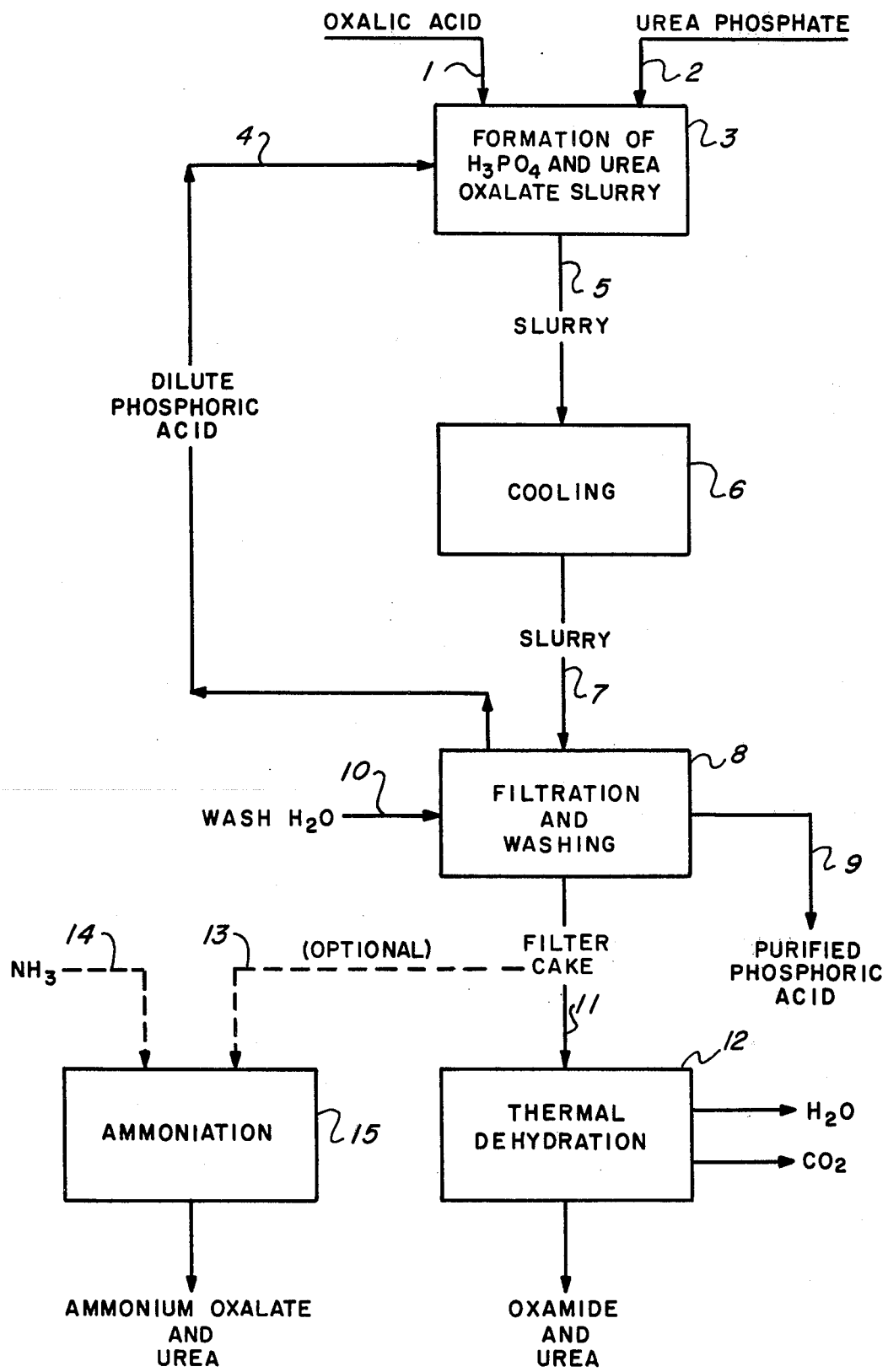

United States Patent [19]

Sheridan

[11] 4,169,882
[45] Oct. 2, 1979

[54] PURIFICATION OF PHOSPHORIC ACID WITH OXALIC ACID

[75] Inventor: Richard C. Sheridan, Sheffield, Ala.

[73] Assignee: Tennessee Valley Authority, Muscle Shoals, Ala.

[21] Appl. No.: 959,979

[22] Filed: Nov. 13, 1978

[51] Int. Cl.² ............................................. C01B 25/22
[52] U.S. Cl. ............................ 423/321 R; 260/561 A; 562/593
[58] Field of Search ................. 423/321 S, 321 R, 304, 423/316, 317, 319; 562/593, 597; 260/561 A, 553 E, 553 R

[56] References Cited

U.S. PATENT DOCUMENTS 3,967,948  7/1976  McCullough .................... 423/321 R

FOREIGN PATENT DOCUMENTS 2511345  9/1975  Fed. Rep. of Germany ...... 423/321 R

Primary Examiner—O. R. Vertiz
Assistant Examiner—Thomas W. Roy
Attorney, Agent, or Firm—Robert A. Petrusek

[57] ABSTRACT

Impure wet-process phosphoric acid is treated with urea by known processes to produce relatively pure urea phosphate which is then treated with oxalic acid to give solid urea oxalate and purified phosphoric acid product. The urea oxalate is either treated with ammonia to give urea and ammonium oxalate or it is pyrolyzed to produce urea and oxamide.

4 Claims, 1 Drawing Figure

PURIFICATION OF PHOSPHORIC ACID WITH OXALIC ACID

The invention herein described may be manufactured and used by or for the Government for governmental purposes without the payment to me of any royalty therefor.

This invention relates to a newly developed process for the purification of wet-process phosphoric acid to yield products eminently suitable for the production of high quality fertilizers; more particularly this invention relates to the purification of wet-process phosphoric acid with urea and oxalic acid; and still more particularly the instant invention relates to the purification of wet-process phosphoric acid with coproduction of oxamide and/or ammonium oxalate.

At the present time, a variety of solid fertilizers are manufactured by utilizing impure wet-process phosphoric acid (IWPA) and ammonia. The numerous congeneric impurities present in such acids are usually not bothersome in solid fertilizers since such compositions are applied in dry form by commercial applicators or spreaders. Such impurities find their way into the IWPA from the phosphate rock ore that is acidulated usually with sulfuric acid, to win therefrom the $P_2O_5$ values therein. Of these impurities, magnesium, iron, and aluminum are considered the most undesirable; also troublesome are fluorine and carbonaceous materials. In order to make a solution fertilizer from IWPA, it is necessary to use an acid that is unusually low in impurities or one that has been partially purified in respect to magnesium. All of the solution fertilizers prepared from IWPA have limited storage lives because the impurities react with the phosphates that are formed as the acid is neutralized with ammonia and unfortunately form insoluble precipitates or gelatinous sludges which settle out of the solution and readily clog nozzles and spray orifices in application equipment. To avoid this difficulty, relatively expensive, pure electric furnace-type phosphoric acid prepared by hydrolysis of $P_2O_5$ derived from elemental phosphorus has been used to make liquid fertilizers. Elemental phosphorus is expensive to produce and so is the acid produced therefrom. Several workers have proposed schemes for the purification of such IWPA involving the use of calcined rock, solvent extraction, or both, to produce a high quality phosphoric acid. However, these schemes suffer from a number of serious drawbacks as outlined in "Phosphoric Acid," Volume I, A. V. Slack, pages 709–724 (1968).

Still other investigators have attempted to purify IWPA by allowing it to react with urea so that crystalline adduct urea phosphate is produced (U.S. Pat. No. 3,356,448, and U.S. Pat. No. 3,713,802). Urea phosphate dissociates in solution to urea and phosphoric acid, but no way has been found to separate the two compounds. Furthermore, ammoniation of the acid leads to a mixture of urea and ammonium phosphate which is difficult and impractical to separate due to the high solubility of these materials. Urea phosphate can be heated to convert it to a mixture of relatively pure short-chain ammonium polyphosphates. This method of utilizing urea phosphate has several attractive features, but it suffers from two major drawbacks. A large portion of the urea is destroyed by conversion to carbon dioxide and ammonia during the pyrolysis, and biuret is formed as a pyrolysis byproduct. The biuret is sparingly soluble and limits the concentration of clear liquid fertilizers that can be prepared from the pyrolyzate.

A process for the preparation of phosphoric acid from relatively pure urea phosphate by treatment with highly concentrated nitric acid has been reported in U.S. Pat. No. 3,967,948 and German Offen. No. 2,511,345. Phosphoric acid and solid urea nitrate are formed, and the mixture is separated by filtration. The process provides a relatively pure acid, but the capital and operating costs are high, and the urea nitrate is a powerful explosive which must be handled with caution.

My invention relates to a process for the purification of IWPA with coproduction of urea and ammonium oxalate and/or oxamide. Urea phosphate prepared from IWPA by known methods and free of all or most of the metallic, fluorine, sulfate, and carbonaceous impurities originally present in the acid is treated with an aqueous solution of oxalic acid to form crystalline urea oxalate and free phosphoric acid. The urea oxalate is separated from the phosphoric acid and treated with ammonia to form urea and ammonium oxalate, or in another embodiment the urea oxalate is thermally decomposed to produce urea and oxamide. The phosphoric acid product is free of all or most of the impurities originally present in the IWPA and is suitable for the production of high quality, clear solution fertilizers that do not precipitate solids during preparation, storage, and shipping.

Oxamide is a valuable slow-release nitrogen fertilizer, but its use as a commercial fertilizer has been limited to experimental testing. The newest methods for the manufacture of oxamide depend on the use of cyanogen (U.S. Pat. Nos. 3,037,055, 3,600,441, and 3,937,732) or hydrogen cyanide (German Offen. No. 2,308,941), both of which are costly and extremely toxic substances. Other methods for producing oxamide are based on the pyrolysis of ammonium oxalate (U.S. Pat. Nos. 3,312,740 and 2,646,448), ammonolysis of diethyl oxalate (I. K. Phelps et al, Am. J. Sci. 24 479, 1907), and glow-discharge electrolysis of formamide solutions (U.S. Pat. No. 3,281,346).

Ammonium oxalate is also a valuable fertilizer whose production and use has been studied in several countries. It not only acts as a source of nitrogen, but it may release soluble phosphate from insoluble calcium phosphates in the soil by formation of calcium oxalate, thereby rendering the phosphate available to the plants.

The reactions involved in my process for the manufacture of purified phosphoric acid and urea oxalate are illustrated by the following equations.

$$CO(NH_2)_2 + H_3PO_4 = CO(NH_2)_2 \cdot H_3PO_4$$

In this step, urea reacts with impure wet-process phosphoric acid to form crystalline urea phosphate which is virtually free of the impurities that were present in the acid.

$$2CO(NH_2)_2 \cdot H_3PO_4 + H_2C_2O_4 = [CO(NH_2)_2]_2 \cdot H_2C_2O_4 + 2H_3PO_4$$

In the second step, the urea phosphate is converted to crystalline urea oxalate and all of the phosphoric acid is liberated.

$$[CO(NH_2)_2]_2 \cdot H_2C_2O_4 + 2NH_3 = 2CO(NH_2)_2 + (NH_4)_2C_2O_4$$

$$[CO(NH_2)_2]_2 \cdot H_2C_2O_4 = CO(NH_2)_2 + (CONH_2)_2 + CO_2 + H_2O$$

In the third step, the urea oxalate is treated with ammonia to produce ammonium oxalate and urea, or alternatively, the urea oxalate is heated to decompose it into urea and oxamide.

It is therefore an object of the present invention to provide a process for the partial or substantially complete purification of IWPA to yield acid suitable for the production of fluid fertilizers that do not deposit solids or gels during preparation, storage, and shipping.

Another objective of the present invention is to combine the purification of IWPA with known processes for the production of pure or partially purified urea phosphate from IWPA.

Still another object of the present invention is to convert urea phosphate prepared by any means to phosphoric acid and solid urea oxalate.

A still further object of the present invention is to convert the urea oxalate prepared by treatment of urea phosphate with oxalic acid to urea and ammonium oxalate.

Yet still another object of the present invention is to convert the urea oxalate prepared by treatment of urea phosphate with oxalic acid to urea and oxamide.

Some advantages of my process over existing processes for the purification of wet-process phosphoric acid and for utilization of urea phosphate are:

1. Wet-process phosphoric acid is purified by the use of urea and oxalic acid which are common and widely used industrial chemicals, and furthermore, substantially all of the urea and oxalic acid are recovered as nitrogen fertilizers.

2. The urea oxalate prepared in my process is nonexplosive, thus the potential problem in the use of urea nitrate (a high explosive material) is avoided.

3. The urea oxalate can be ammoniated to give urea and diammonium oxalate, both of which are excellent fertilizers. Furthermore, the urea oxalate is easily converted into urea and oxamide by a simple heat treatment. Oxamide is a highly effective and desirable slow-release nitrogen fertilizer.

4. Another advantage of my process lies in the utilization of urea phosphate which can be prepared in nearly pure form by simple and economical methods.

5. The small amount of urea in the product phosphoric acid is recovered as nitrogen fertilizer when the acid is processed into a fertilizer. Likewise, the phosphate values in the urea oxalate remain in the product urea-oxamide or urea-ammonium oxalate mixtures. Thus, all of the nitrogen and phosphorus is eventually utilized as fertilizer in one form or another.

This invention, together with further objects and advantages thereof, will be better understood from a consideration of the following description taken in connection with the accompanying drawing in which:

The FIGURE is a flowsheet illustrating the principal novel process which results in a purified phosphoric acid treated with urea and oxalic acid.

Referring now more specifically to the FIGURE, 3 represents any vessel suitable for containing the reaction mixture. Urea phosphate 2, oxalic acid 1, and water in the form of dilute phosphoric acid 4 are fed to reactor 3 to form a slurry of urea oxalate in purified phosphoric acid. The slurry is fed via line 5 to cooler 6 and then via line 7 to filtering and washing apparatus 8. The filtrate is purified phosphoric acid and it is withdrawn via line 9 as product. The urea oxalate filter cake is washed with water via line 10 to recover the adhering phosphoric acid. The filtrate from the washing step is dilute phosphoric acid which is recycled to reactor 3 via line 4. The urea oxalate filter cake from apparatus 8 is fed via line 11 to reactor 12 where it is heated to thermally decompose it into oxamide and urea with the expulsion of water and carbon dioxide. Or, if desired, part or all of the urea oxalate filter cake from apparatus 8 is fed via line 13 to reactor 15 where it is neutralized with ammonia fed via line 14 to produce a mixture of urea and ammonium oxalate.

In order that those skilled in the art may better understand how the present invention can be practiced, the following examples are given by way of illustration and not necessarily by way of limitation.

EXAMPLE I

A solution of oxalic acid consisting of 126 grams $H_2C_2O_4 \cdot 2H_2O$ dissolved in 150 mL water was heated to 70° C. and treated with 316 grams of urea phosphate made from wet-process phosphoric acid made from uncalcined Florida phosphate rock. The urea phosphate was added gradually in small amounts over about a 10-minute period with stirring while the temperature was maintained at 65° to 75° C. The mixture was cooled slowly and then filtered. The filtrate weighed 381.8 grams, and it was concentrated by stirring and heating until a temperature of 110° C. was reached, when it weighed 256.8 grams. Chemical analysis of the clear, slightly amber filtrate gave a composition of 50.6 percent $P_2O_5$, 3.6 percent N, 1.3 percent oxalic acid, 0.06 percent Al, 0.10 percent Fe, 0.02 percent Mg, 0.03 percent F, and 0.3 percent $SO_4$. This corresponds to 88 to 96 percent removal of the Al, Fe, Mg, F, and $SO_4$ impurities from the phosphoric acid used in making the urea phosphate. The unwashed, dried urea oxalate filter cake weighed 191.7 grams, and it contains 3.4 percent $P_2O_5$ and 23.5 percent N. X-ray analysis showed that it was essentially urea oxalate. Ten grams of the urea oxalate was heated for 15 minutes at 185° C. The resulting product was a mixture of oxamide (2.6 grams, 62 percent yield), urea (2.4 grams), and ammonium oxalate (2.2 grams). After washing to remove the soluble products, pure homogeneous crystals of oxamide were obtained. The presence of phosphoric acid in the urea oxalate acts as a catalyst to promote the formation of oxamide—when no $H_3PO_4$ was present, the oxamide yield under the above conditions was only 12 percent.

EXAMPLE II

A solution of oxalic acid consisting of 126 grams of $H_2C_2O_4 \cdot 2H_2O$ dissolved in 200 mL water was heated to 60° C. and treated with 316 grams of urea phosphate made from wet-process phosphoric acid made from uncalcined Florida phosphate rock. The urea phosphate was added gradually in small amounts over a 15-minute period with stirring while the temperature was kept at 65° to 75° C. The mixture was cooled in ice water, and filtered. The clear, slightly amber filtrate weighed 352.2 grams, and it contained 33.7 percent $P_2O_5$, 2.0 percent N, 1.34 percent oxalic acid, 0.09 percent Al, 0.31 percent Fe, 0.02 percent Mg, 0.14 percent F, and 0.4 percent $SO_4$; this analysis corresponds to 46 to 91 percent removal of the Al, Fe, Mg, F, and $SO_4$ impurities originally present in the phosphoric acid used to make the urea phosphate. The unwashed, dried urea oxalate filter cake weighed 239.1 grams, and it contained 1.71 percent $P_2O_5$, 25.3 percent N, and 41.8 percent oxalic acid (calculated for urea oxalate; 26.95 percent; 42.86 percent oxalic acid).

X-ray diffraction analysis showed that urea oxalate was the major phase in the solid product. Samples of the urea oxalate were heated for five minutes at 151° C. and at 190° C., but no oxamide was produced. When other samples were heated at 155° C. for 35 minutes or for 20 minutes at 163° C., oxamide was found as a major phase in the products.

EXAMPLE III

A solution of oxalic acid consisting of 126 grams of $H_2C_2O_4 \cdot 2H_2O$ dissolved in 200 mL water was heated to 60° C. and treated with 316 grams of urea phosphate made from wet-process phosphoric acid made from calcined North Carolina phosphate rock. The urea phosphate was added gradually in small amounts over a 10-minute period with stirring while the temperature was kept at 65° to 75° C. The mixture was cooled in ice water, and filtered. The clear, pale green filtrate weighed 333.2 grams, and it contained 36.8 percent $P_2O_5$ 2.56 percent N, 1.14 percent oxalic acid, 0.04 percent Al, 0.13 percent Fe, 0.08 percent Mg, 0.06 percent F, and 0.5 percent $SO_4$. This analysis corresponds to 79 to 86 percent removal of the Al, Fe, Mg, F, and $SO_4$ impurities originally present in the phosphoric acid used to make the urea phosphate. The dried, unwashed urea oxalate filter cake weighed 197.0 grams, and it contained 5.41 percent $P_2O_5$, 24.5 percent N, and 39.7 percent oxalic acid. X-ray diffraction analysis showed that urea oxalate was the major phase in the solid product. A sample of the urea oxalate (20.0 grams) was heated to 75° C. in a rotating, tumbling bed-type reactor and treated with gaseous ammonia until it gained 3.2 grams in weight, which corresponds to neutralization of the urea oxalate to urea and ammonium oxalate. X-ray diffraction analysis showed that these compounds were the major phases in the sample. Ammoniated urea oxalate contains 34.4 percent N with one-third of the total nitrogen present as the ammonium cation.

EXAMPLE IV

A solution of oxalic acid consisting of 138.7 grams of oxalic acid dihydrate dissolved in 200 mL water was warmed to 60° C. and treated with 316 grams of urea phosphate made from wet-process phosphoric acid made from calcined North Carolina phosphate rock. The urea phosphate was added gradually over a 10-minute period with stirring while maintaining the temperature at 55°–60° C. Stirring and heating (at 60°–70° C.) was continued for 20 minutes. The hot mixture was filtered, and the clear, pale green filtrate was cooled to 5° C. and refiltered. The second filtrate weighed 377.2 grams, and it contained 32.1 percent $P_2O_5$, 1.82 percent N, 1.3 percent oxalic acid, 0.04 percent Al, 0.11 percent Fe, 0.08 percent Mg, and $SO_4$. This corresponds to removal of 74 to 80 percent of the Al, Fe, Mg, F, and $SO_4$ impurities originally present in the phosphoric acid used to make the urea phosphate. The urea oxalate filter cake from the first filtration was washed with about 200 mL of cold water and then dried, yielding 112.7 grams of urea oxalate containing 0.03 percent $P_2O_5$, 26.4 percent nitrogen, and 43.3 percent oxalic acid (theoretical composition of urea oxalate is 26.95 percent nitrogen and 42.86 percent oxalic acid). X-ray diffraction analysis showed that it was homogeneous as urea oxalate.

The wash from the urea oxalate (first filter cake) weighed 220.0 grams, and it contained 5.6 percent $P_2O_5$, 1.17 percent N, and 2.3 percent oxalic acid. The second filtration yielded 66.0 grams of dried, unwashed crystals which contained 5.0 percent $P_2O_5$, 20.9 percent N, and 47.8 percent oxalic acid.

After sifting and winnowing through the data presented in the examples supra and other data which I have assembled in discovering and developing my invention, I have determined that the operable parameters and preferred embodiments of my invention are as follows:

The mole ratio of urea phosphate to oxalic acid is preferably 2.0 but other ratios such as 1.9 or 2.1 may be used, if desired. A mole ratio of about 2.0 is desirable to give efficient recovery of phosphoric acid and urea oxalate.

The mole ratio of water to urea phosphate may range from about 3 to about 6, but a mole ratio of between 3 and 4 is preferred. A mole ratio of less than about 3 is generally undesirable because the reaction of oxalic acid and urea phosphate does not go to completion in highly concentrated solutions. On the other hand, a mole ratio of water to urea phosphate greater than about 6 should be avoided unless a dilute phosphoric acid is desired. The water is first used to wash the urea oxalate filter cake, thereby recovering the phosphoric acid adhering to the crystals, and the filtrate from this washing step is fed to reactor 3.

The temperature at which urea oxalate is crystallized is operable from about 15° to 100° C., but it is preferred to carry out the reaction at 60° C. to 80° C. The resulting slurry is cooled slowly to room temperature or below to promote the growth of larger crystals and to minimize the solubility of urea oxalate in the product phosphoric acid.

The temperature at which urea oxalate is heated to decompose it to oxamide is preferably 160° to 185° C., although some oxamide was obtained at both lower (150° C.) and higher (200° C.) temperatures. At temperatures below 150° C., little or no oxamide forms. The time of heating will vary from 10 minutes to 30 minutes or longer, depending on the temperature.

The ammoniation of urea oxalate to produce urea and ammonium oxalate is carried out by intimate contact at 25° to 132° C. for a period of time sufficient to absorb the required amount of ammonia. The preferred temperature is 75° to 100° C.

What I claim as new and desire to secure by Letters Patent of the United States is:

1. A process for purification of wet-process phosphoric acid by use of urea and oxalic acid with coproduction of oxamide which comprises the steps of:
   (a) mixing wet-process phosphoric acid with about stoichiometric amounts of urea to effect the preparation of urea phosphate, said resulting urea phosphate containing less than about 50 percent of the congeneric impurities originally present in said wet-process acid;
   (b) mixing said resulting urea phosphate with oxalic acid and with water in the mole ratios 1.9 to 2.1 and 3 to 6, respectively, at a temperature in the range from about 15° C. to about 100° C.;
   (c) cooling the resulting slurry, separating the product phosphoric acid from the urea oxalate; and
   (d) heating the urea oxalate with a catalytic amount of an acidic phosphate (3 to 15 weight percent) at temperatures ranging from about 150° C. to about 200° C. to form a mixture of urea and oxamide.

2. The process of claim 1 wherein step (b) thereof the mole ratios of urea phosphate with oxalic acid and with water is about 2 and about 3 to 4, respectively, wherein the mixing of same is effected at a temperature in the range from about 60° to about 80° C., and wherein step (d) thereof the temperature of heating of the urea oxalate with the acidic phosphate ranges from about 160° C. to about 185° C.

3. A process according to claims 1 or 2 wherein the urea oxalate is contacted with ammonia at a temperature in the range from about 25° C. to about 132° C. to form a mixture of urea and ammonium oxalate.

4. A process according to claims 1 or 2 wherein the urea oxalate is contacted with ammonia at a temperature in the range from about 75° C. to about 100° C. to form a mixture of urea and ammonium oxalate.

* * * * *